Aug. 23, 1949. S. E. MOWER 2,479,765
NESTING BOWLS WITH HANDLES
Filed May 24, 1946
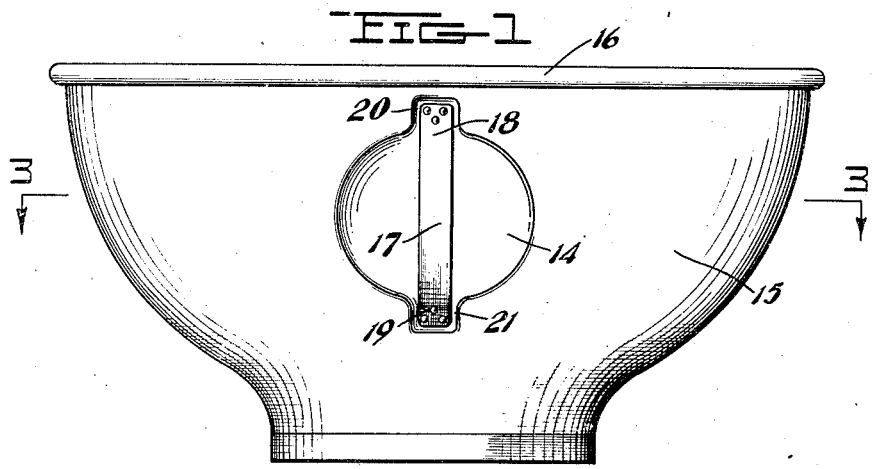
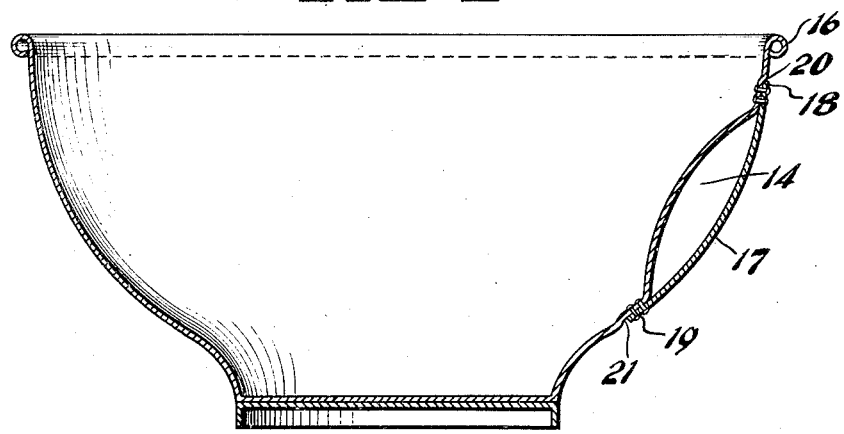
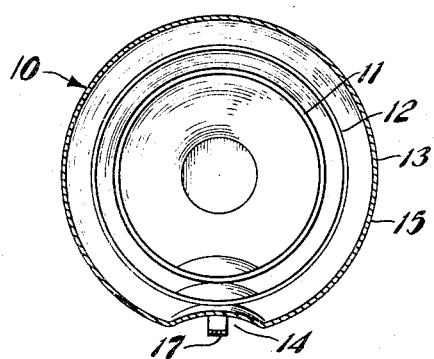
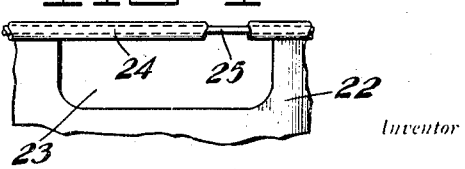
Inventor
Stanley E. Mower
By Clarence A. O'Brien
and Harvey B. Jacobson
Attorneys Patented Aug. 23, 1949

2,479,765

UNITED STATES PATENT OFFICE 2,479,765

NESTING BOWLS WITH HANDLES

Stanley E. Mower, Montclair, N. J.

Application May 24, 1946, Serial No. 671,940

1 Claim. (Cl. 220—97)

The invention sufficiently described in the following specification that those versed in its art may understand its purposes, its functions and its mode of construction and manufacture, is also shown in the accompanying drawings which illustrate at least two forms thereof.

This invention has for another object to provide a set of bowls having handles intermediate of the side walls, said handles being of a nature to permit nesting of the bowls.

A still further object of the invention is to provide a set of nesting bowls so formed with handles that, individually, they may be easily held with one hand.

Another object of the invention is to provide a set of mixing bowls certain of which are provided with handles intermediate of their upper and lower edges, the bowls being graduated in size to nest together one within the other.

Other features and advantages will become more readily apparent from the following description and the accompanying illustrative drawings in which:

Figure 1 is an elevational view of the invention,

Figure 2 is a view similar to Figure 1 shown from a different angle,

Figure 3 is a horizontal sectional view of a set of the bowls shown nested, and

Figure 4 is a detailed fragmentary view of a modification.

My idea is to provide a set of mixing bowls that in themselves are light in weight, and have a handle attached to the side, flush with the contour of the bowl. The bowl would be drawn or spun from aluminum or some other lightweight metal. This would provide a bowl considerably lighter than ordinary mixing bowls, which are made of a glazed ceramic material. The side of the bowl would be dished in sufficiently to allow three or four fingers to be inserted between the bowl and the handle. The handle would be curved to preserve the contour of the bowl so that there are no projections that would prevent a bowl from nesting in one of a larger size. The handle would be attached by rivets or by welding, depending on what metal is used in the bowl.

Present day bowls are heavy and their glazed surface is very slippery—it is most difficult for the average housewife to lift a bowl, laden with batter, with one hand, and guide and scrape the contents into a pan with the other. She just doesn't possess the strength. The handle will enable her to easily hold it with one hand, leaving the other free for other tasks.

In addition to the ease with which the bowl can be lifted and held, and in addition to its light weight, this bowl is unbreakable, dropping will not break it, or hard knocks will not send a shower of ceramic chips into the food. It can also be used for ovenware, as heat will not affect it. This also means it can be sterilized with boiling water without cracking. The shape would be varied so that they can be used with any of the several commercial kitchen mixing units.

While an embodiment of the invention is illustrated in the above referred to drawings, it is to be understood that they are merely for the purpose of illustration and that various changes in construction may be resorted to in the course of manufacture in order that the invention may be utilized to the best advantage according to circumstances which may arise, without in any way departing from the spirit and intention of the device which is to be limited only in accordance with the appended claim. And while there is stated the primary field of utility of the invention it remains obvious that it may be employed in any other capacity wherein it may be found applicable.

In the accompanying drawings, and in the following specification, the same reference characters are used to designate the same parts and elements throughout and in which 10 has reference to the complete invention which consists of a set of bowls 11—12, 13, etc., contoured for nesting one within the other. The larger sizes of these bowls are provided countersunk portions 14 indented from the outer wall surfaces 15 below the rolled rims 16 thereof. Attached vertically over the recesses 14 are handles 17, the ends 18 and 19 of which are set in flush with said surfaces 15 in recesses 20 and 21 impressed in the wall 15. These handles 17 are bowed to the exact contour of the said wall 15. The diameter of the countersinks 14 is such as to permit three or four fingers of a hand to seat therein when lifting or holding the bowl by the handle. The said handle ends may be either riveted or welded to the bowl.

In Figure 4 of the drawings is shown a modification of the invention in which the wall 22 is provided with a cut out 23 of a width to receive a user's hand and directly below the roll 24. The said roll at the point adjacent the cut out may be provided with a stiffening rod or wire 25, if found desirable.

From the foregoing specification it will become apparent that the invention disclosed will adequately accomplish the functions for which it has been designed and in an economical manner and that its simplicity, accuracy and ease of operation are such as to provide a relatively inexpensive device considering what it will accomplish and that it will find an important place in the art to which it appertains when once placed on the market.

It is thought that persons skilled in the art to which the invention relates will be able to obtain a clear understanding of the invention after considering the description in connection with the drawings. Therefore, a more lengthy description is regarded as unnecessary.

Changes in shape, size and rearrangement of details and parts such as come within the purview of the invention claimed may be resorted to, in actual practice, if desired.

Having now described the invention that which is claimed to be new and desired to be procured by Letters Patent is:

A group of bowls of gradually diminishing sizes for nesting one within another, each such bowl including a side wall the outer face of which is convex, said side wall having a relatively deep recess entering its convex face and diametrically opposed relatively shallow lateral recesses opening into the deep recess and a convex handle fixed at oposite ends in the shallow recesses and bridging the deep recess, said handle lying wholly within the peripheral confines of the side wall.

STANLEY E. MOWER.

REFERENCES CITED

The following references are of record in the file of this patent:

UNITED STATES PATENTS

| Number | Name | Date |
|---|---|---|
| D. 34,895 | McFaddin | Aug. 6, 1901 |
| 1,137,759 | Johnson | May 4, 1915 |
| 1,380,066 | Johnson | May 31, 1921 |
| 1,380,308 | Rogers | May 31, 1921 |
| 2,060,781 | Annen | Nov. 17, 1936 |
| 2,075,049 | Niemi | Mar. 30, 1937 |
| 2,082,005 | Jenett | June 1, 1937 |

FOREIGN PATENTS

| Number | Country | Date |
|---|---|---|
| 9,438 | Great Britain | June 7, 1889 |